United States Patent
Cheng

(10) Patent No.: US 6,802,266 B2
(45) Date of Patent: Oct. 12, 2004

(54) WORK TABLE WITH A SAWDUST COLLECTING MECHANISM

(76) Inventor: Meng-Chieh Cheng, No. 169, Chung-Shan Rd., Fengyuan City, Taichung Hsien (TW)

( * ) Notice: Subject to any disclaimer, the term of this patent is extended or adjusted under 35 U.S.C. 154(b) by 207 days.

(21) Appl. No.: 10/241,731

(22) Filed: Sep. 10, 2002

(65) Prior Publication Data

US 2003/0217675 A1 Nov. 27, 2003

(30) Foreign Application Priority Data

May 21, 2002 (TW) .................................. 91207286 U

(51) Int. Cl.[7] .............................................. A47B 37/00
(52) U.S. Cl. ..................................................... 108/50.13
(58) Field of Search ............................. 108/50.13, 161,
108/50.11, 24; 312/229, 236, 31; 269/13,
21; 454/56, 49; 83/451, 56

(56) References Cited

U.S. PATENT DOCUMENTS

| | | | | |
|---|---|---|---|---|
| 2,341,628 A | * | 2/1944 | Koweindl ................. | 108/50.13 |
| 2,709,954 A | * | 6/1955 | Baker ....................... | 108/50.13 |
| 3,222,051 A | * | 12/1965 | Bevilacqua ................ | 269/21 |
| 4,324,487 A | * | 4/1982 | Nishihama ................ | 396/517 |
| 5,487,536 A | * | 1/1996 | McEachin .................. | 269/21 |
| 5,716,267 A | * | 2/1998 | Hambleton et al. ......... | 454/56 |
| 6,241,597 B1 | * | 6/2001 | Chiang et al. ............. | 454/49 |
| 6,444,002 B1 | * | 9/2002 | Mai .......................... | 454/56 |
| 6,572,091 B2 | * | 6/2003 | Kimble ..................... | 269/21 |
| 6,694,892 B2 | * | 2/2004 | Lin et al. .................. | 108/50.13 |
| 6,698,360 B2 | * | 3/2004 | Park ......................... | 108/50.13 |
| 6,732,624 B1 | * | 5/2004 | Gaubatz .................... | 83/451 |

FOREIGN PATENT DOCUMENTS

| | | | | |
|---|---|---|---|---|
| GB | 2109716 | * | 6/1983 | ................. 269/21 |
| GB | 2120141 | * | 11/1983 | ................. 269/21 |

* cited by examiner

Primary Examiner—Jose V. Chen
(74) Attorney, Agent, or Firm—Townsend and Townsend and Crew LLP

(57) ABSTRACT

A work table includes a box having a bottom plate formed with an outlet port. A distributor is disposed in the box, and cooperates with the box to define a lower chamber in fluid communication with the outlet port and an upper chamber above the distributor. The distributor has entrance holes that communicate the upper and lower chambers. A working panel is mounted on the box, and is formed with apertures for access to the upper chamber. A suctioning device includes a sawdust collecting container, and an air conduit interconnecting the outlet port and the container, and having a branch. A cap is detachably mounted on the branch. A blind is mounted movably on the air conduit between the outlet port and the branch.

1 Claim, 5 Drawing Sheets

US 6,802,266 B2

WORK TABLE WITH A SAWDUST COLLECTING MECHANISM

CROSS REFERENCE OF RELATED APPLICATION

This application claims priority of Taiwan Application No. 091207286, filed on May 21, 2002.

BACKGROUND OF THE INVENTION

1. Field of the Invention

The present invention relates to a work table, more particularly to a work table with a sawdust collecting mechanism.

2. Description of the Related Art

Referring to FIG. 1, a conventional work table is shown to include a stand 1, a workpiece-supporting box 2, a working panel 3, and a suctioning device 4.

As illustrated, the box 2 includes a bottom plate 201 that is disposed on the stand 1 and that has a peripheral edge, and a peripheral wall 202 that extends uprightly from the peripheral edge of the bottom plate 201 to define a receiving chamber 203. The bottom plate 201 is formed with an outlet port 204.

The working panel 3 is disposed on the peripheral wall 202 to cover the receiving chamber 203, and is formed with a plurality of equidistantly spaced apart apertures 303 that are in fluid communication with the receiving chamber 203.

The suctioning device 4 includes an air conduit 403, a blower unit 401, and a sawdust container 407. The air conduit 403 has a first end connected to the outlet port 204 of the box 2 and a second end connected to an inlet of the blower 401. The sawdust container 407 is connected to an outlet of the blower 401 via a piping in such a manner that when the blower 401 is actuated, sawdust resulting from an abrasive operation performed on the working panel 3 is collected in the sawdust container 407 via the apertures 303 in the working panel 3 and the outlet port 204 in the bottom plate 201. Preferably, an air-filtering bag 406 is mounted on a top end of the sawdust container 407 via a fastener belt 405 to enhance collection of the sawdust in the sawdust container 407.

One disadvantage of the aforementioned conventional work table resides in that since there is no sawdust guiding means provided in the receiving chamber 203 for guiding the sawdust toward the outlet port 204, the sawdust tends to accumulate at corners of the box 2.

SUMMARY OF THE INVENTION

Therefore, the object of this invention is to provide a work table having a sawdust collecting mechanism so as to eliminate the aforesaid disadvantage.

Accordingly, a work table of the present invention includes: a stand; a workpiece-supporting box including a bottom plate disposed on the stand and having a peripheral edge, and a peripheral wall extending upwardly from the peripheral edge of the bottom plate to define a receiving chamber, the bottom plate being formed with an outlet port; a sawdust collecting mechanism including opposing left and right guide plates extending inclinedly and downwardly from the peripheral wall toward the outlet port, the left and right guide plates having opposing end walls distal from the peripheral wall and cooperating with the bottom plate to define a groove that is in fluid communication with the outlet port, the sawdust collecting mechanism further including a distributor member of an inverted U-shaped cross section disposed in the groove, cooperating with the bottom plate to confine a lower chamber in fluid communication with the outlet port, and cooperating with the left and right guide plates and the peripheral wall to confine an upper chamber above the lower chamber, the distributor member being formed with a plurality of spaced apart entrance holes that fluidly communicate the upper and lower chambers, and a working panel disposed on the peripheral wall, covering the upper chamber and formed with a plurality of spaced apart apertures that are in fluid communication with the upper chamber; a suctioning device including a blower with an inlet and an outlet, a sawdust collecting container connected to the outlet of the blower, and an air conduit having a first end connected to the outlet port in the bottom plate, a second end connected to the inlet of the blower, and a branch disposed between the first and second ends and having a free end; and a suction-switching unit including a cap detachably mounted on the free end of the branch for sealing the branch so as to prevent air from flowing therethrough upon actuation of the blower, and a blind mounted movably on the air conduit between the outlet port in the bottom plate and the branch, and movable between a blocking position, in which the blind extends into the air conduit to prevent air from being introduced into the workpiece-supporting box and through the outlet port upon actuation of the blower, and a non-blocking position, in which the blind retracts from the air conduit so as to permit entry of air into the box and through the outlet upon actuation of the blower and so as to permit collection of sawdust resulting from an abrasive operation performed on the working panel in the sawdust collecting container via the apertures in the working panel, the upper and lower chamber, the outlet port in the bottom plate, and the air conduit.

BRIEF DESCRIPTION OF THE DRAWINGS

Other features and advantages of this invention will become more apparent in the following detailed description of the preferred embodiment of this invention, with reference to the accompanying drawings, in which.

DETAILED DESCRIPTION OF THE PREFERRED EMBODIMENT

Figure 1:
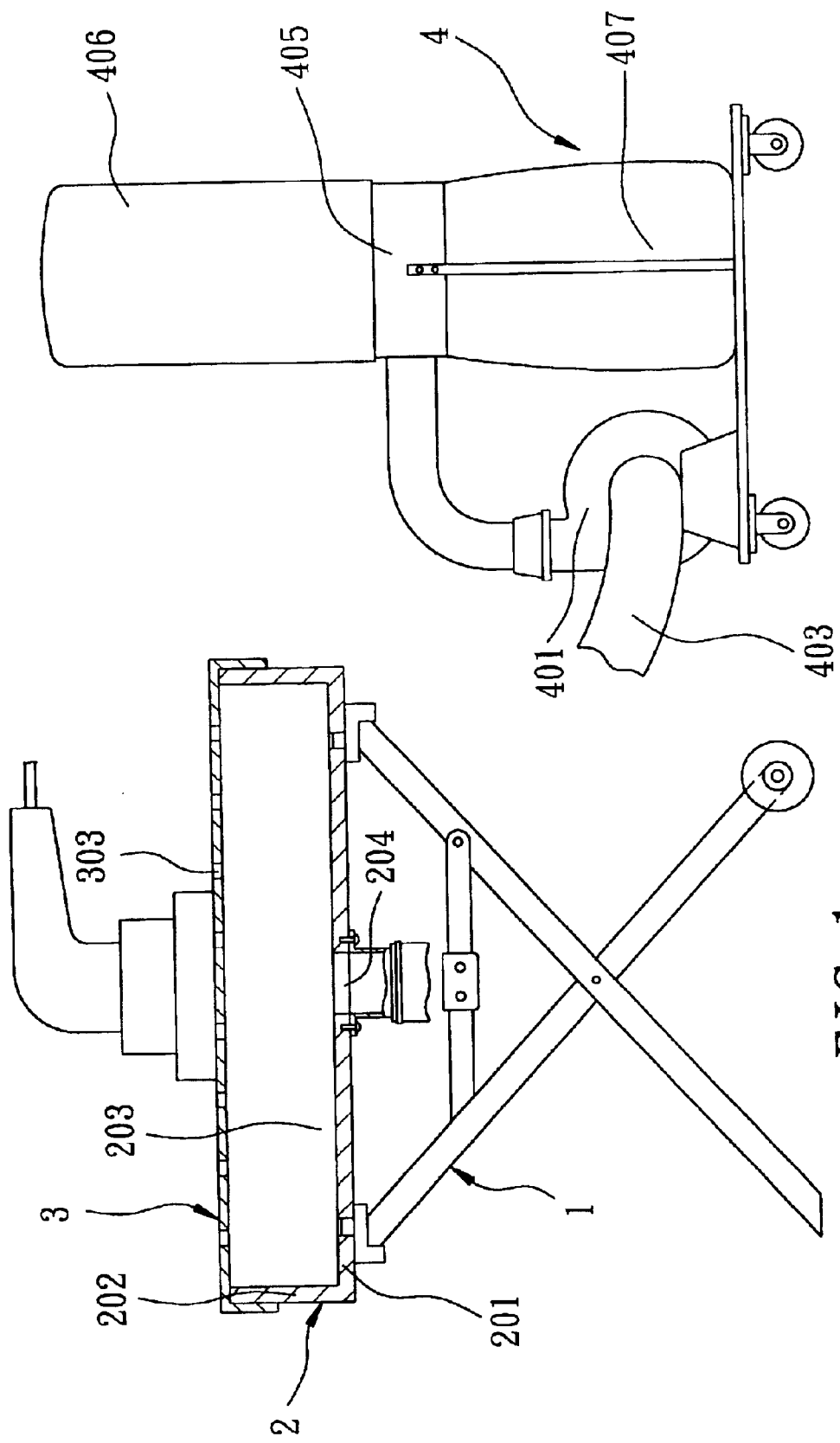
FIG. 1 is a schematic view of a conventional work table.
Figure 2:
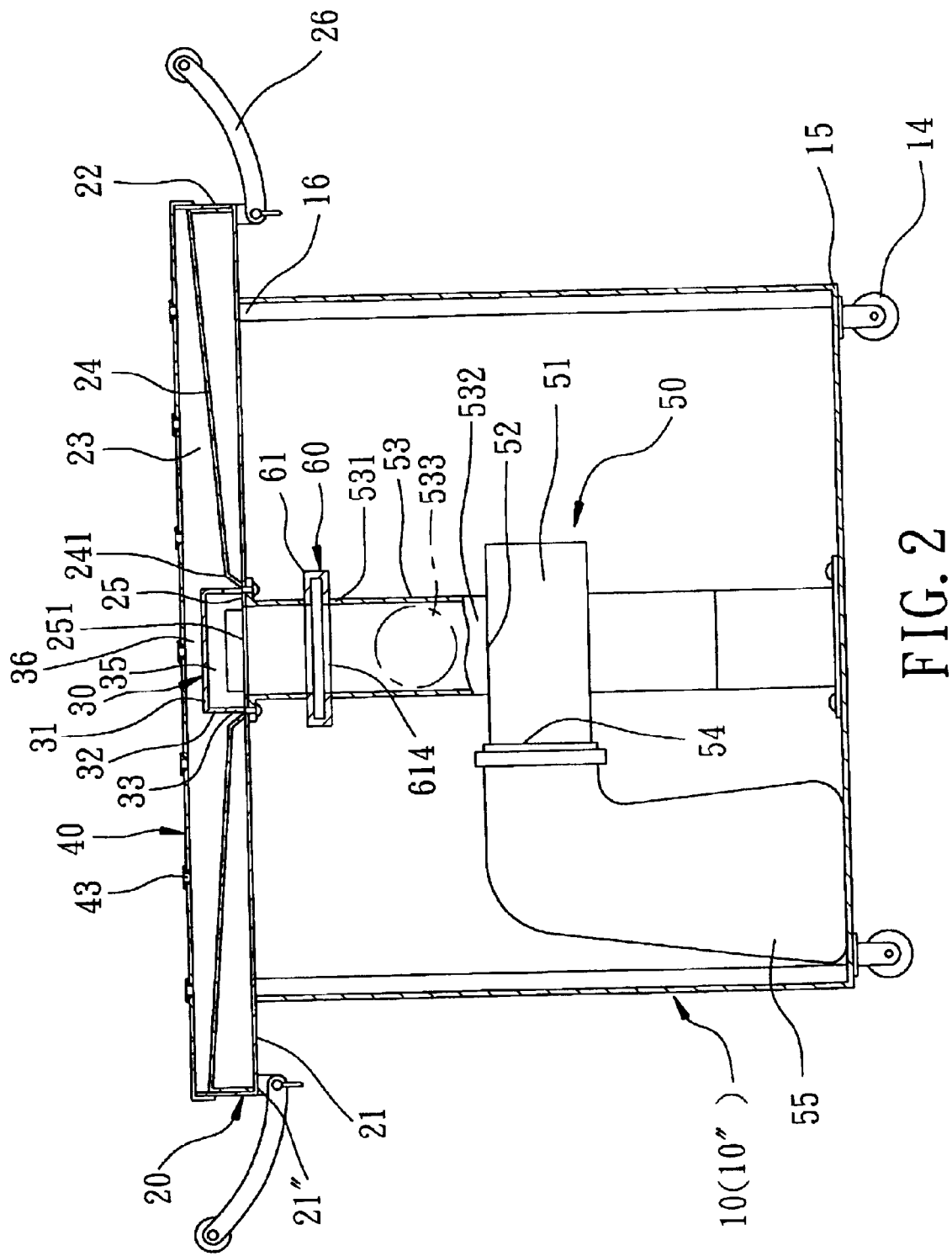
FIG. 2 is a schematic view of a preferred embodiment of a work table according to the present invention.
Figure 3:
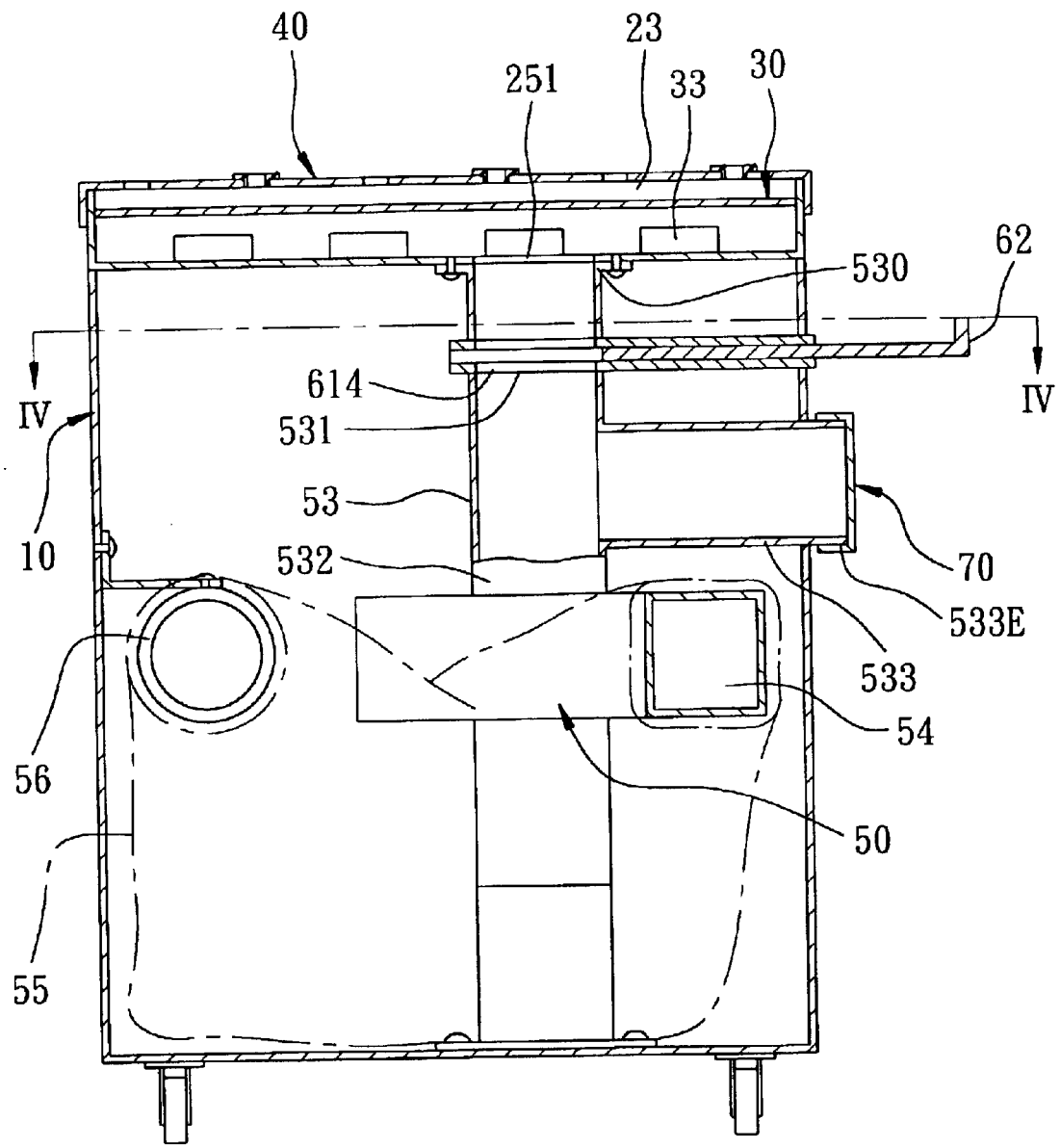
FIG. 3 is a sectional view of the preferred embodiment, illustrating how a blind is moved to a non-blocking position in order to permit collection of sawdust in a sawdust collecting container upon actuation of a blower.
Figure 4:
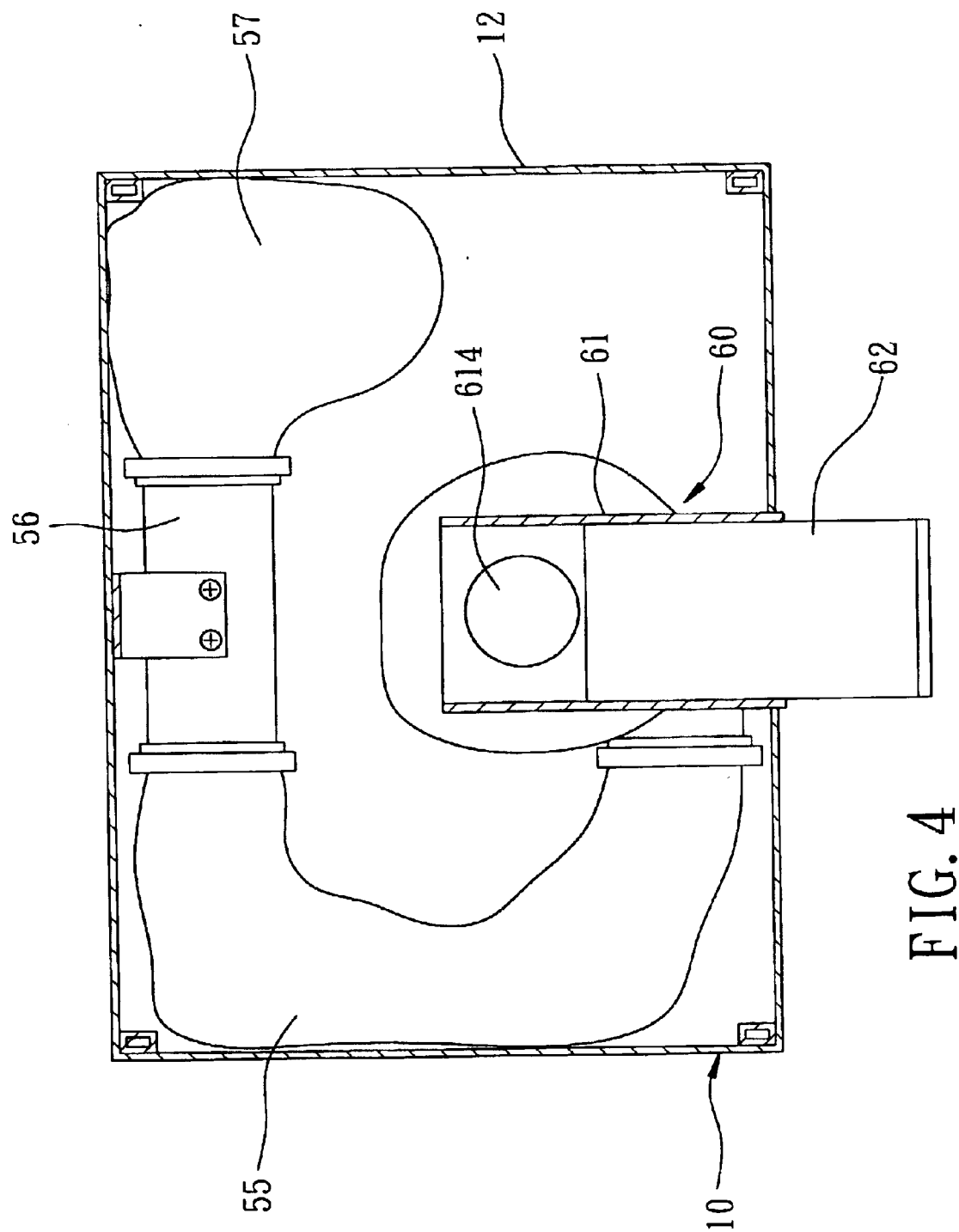
FIG. 4 is a cross sectional view of the preferred embodiment taken along line IV—IV of FIG. 3.

Referring to FIGS. 2 to 4, the preferred embodiment of a work table according to the present invention is shown to include a support stand 10, a workpiece-supporting box 20, a sawdust collecting mechanism, a suctioning device 50, and a suction-switching unit.

As illustrated, the support stand 10 is in the form of a hollow casing 10", and has a top 16 and a bottom 15 provided with a plurality of casters 14 to facilitate movement thereof.

The box 20 includes a bottom plate 21 disposed on the top 16 of the support stand 10 and having a peripheral edge 21", and a peripheral wall 22 extending upwardly from the peripheral edge 21" of the bottom plate 21 to define a receiving chamber 23. The bottom plate 21 is formed with an outlet port 251.

The sawdust collecting mechanism includes opposing left and right guide plates 24, a distributor member 30, and a working panel 40. The left and right guide plates 24 extend inclinedly and downwardly from the peripheral wall 22 toward the outlet port 251. The left and right guide plates 24 have opposing end walls 241 that are distal from the peripheral wall 22 and that cooperate with the bottom plate 21 to define a groove 25 that is in fluid communication with the outlet port 251. The distributor member 30 is disposed in the groove 25, and cooperates with the bottom plate 21 to confine a lower chamber 35 that is in fluid communication with the outlet port 251. The distributor member 30 cooperates with the left and right guide plates 24 and the peripheral wall 22 to confine an upper chamber 36 above the lower chamber 35. The distributor member 30 is formed with a plurality of spaced apart entrance holes 33 that fluidly communicate the upper and lower chambers 36, 35. The working panel 40, which is in the form a horizontal plate, is disposed on the peripheral wall 22 to cover the upper chamber 36, and is formed with a plurality of equidistantly spaced apart apertures 43 that are in fluid communication with the upper chamber 36.

The suctioning device 50 includes a blower 51, a sawdust collecting container 55, an air conduit 53, and a branch 533. The blower 51 has an inlet 52 and an outlet 54. The sawdust collecting container 55 is connected to the outlet 54 of the blower 51. The air conduit 53 defines a fluid passage 531, and has a first end 530 (see FIG. 4) connected to the outlet port 251 in the bottom plate 21, a second end 532 connected to the inlet 52 of the blower 51, and a branch 533 disposed between the first and second ends 530, 532. The branch 533 has a free end 533E exposed from the hollow casing 10".

The suction-switching unit includes a cap 70 and a blind 60. The cap 70 is detachably mounted on the free end 533E of the branch 533 for sealing the branch 533 so as to prevent air from flowing therethrough upon actuation of the blower 51. The blind 60 is mounted movably on the air conduit 53 between the outlet port 251 in the bottom plate 21 and the branch 533, and is movable between a blocking position, in which, the blind 60 extends into the fluid passage 531 of the air conduit 53 to prevent air from flowing through the fluid passage 531 upon actuation of the blower 51, and a non-blocking position, in which, the blind 60 retracts from the fluid passage 531 of the air conduit 53 so as to permit flow of air through the fluid passage 531 upon actuation of the blower 51.

Preferably, an air-filtering bag 57 is connected to the sawdust collecting container 55 via a connecting piping 56 in such a manner that when the blower 51 is actuated, sawdust resulting from an abrasive operation performed on the working panel 40 is collected in the sawdust collecting container 55 via the apertures 43 in the working panel 40, the upper and lower chambers 35, 36, and the outlet port 251 in the bottom plate 21, and the air conduit 53, thereby enhancing collection of the sawdust in the sawdust collecting container 55.

Figure 5:
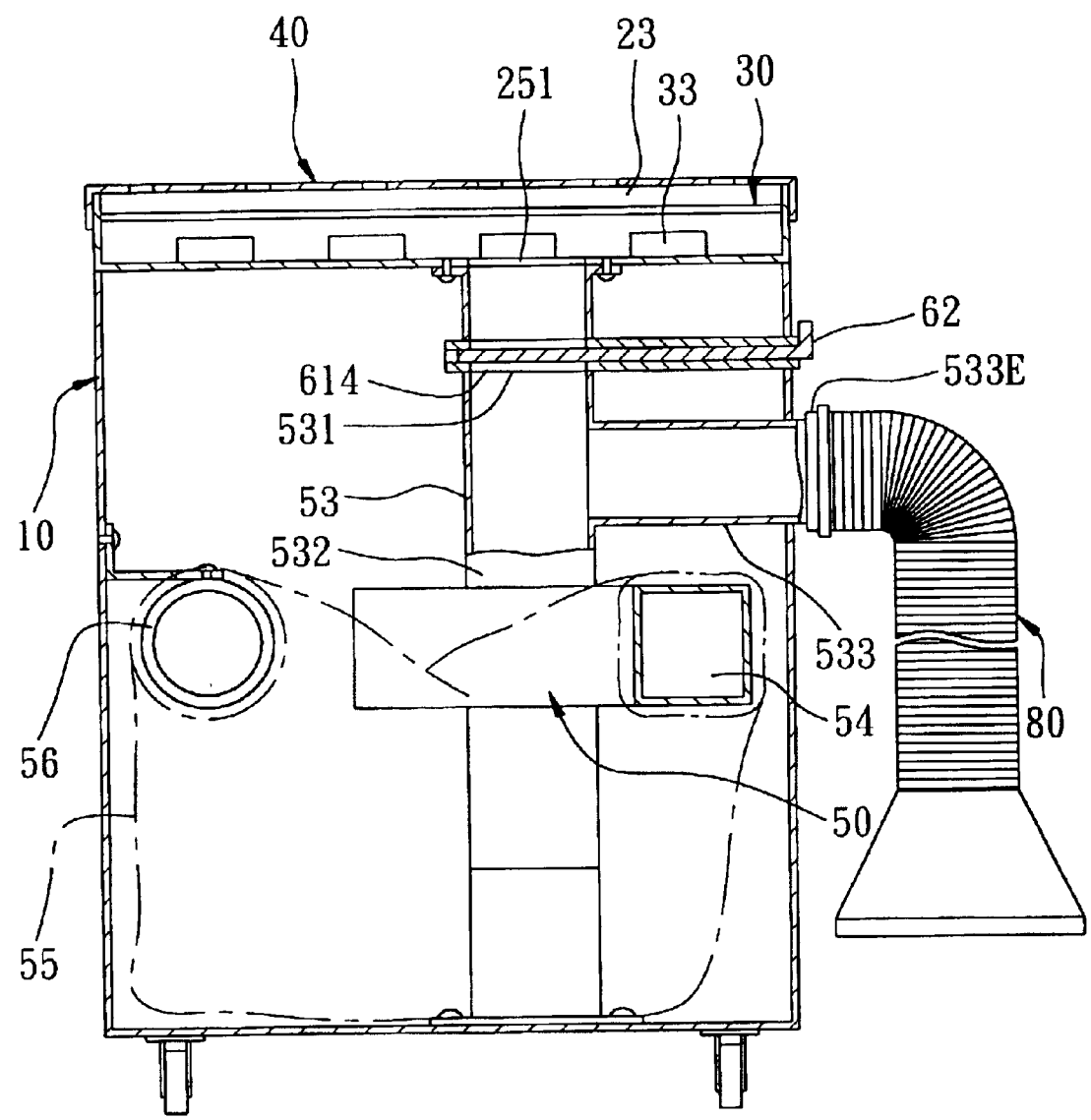
FIG. 5 is a sectional view of the preferred embodiment, illustrating how the blind is moved to a blocking position so as to convert the preferred embodiment into a vacuum cleaner.

In this preferred embodiment, the distributor member 30 has an inverted U-shaped cross-section, and includes a horizontal upper portion 31 disposed above the bottom plate 21, and left and right vertical portions 32 which extend downwardly and respectively from two opposite sides of the upper portion 31 to the bottom plate 21 and which are formed with the entrance holes 33 therethrough. The blind 60 preferably includes a blind casing 61 mounted midway of the air conduit 53 and defining a through hole 614 in fluid communication with the fluid passage 531 in the air conduit 53, and a movable plate 62 mounted movably on the blind casing 61. The plate 62 is movable between the blocking position, as best shown in FIG. 5, in which the plate 62 blocks the through hole 614, thereby preventing air from being introduced into the workpiece-supporting box 20 and through the through hole 614, and the non-blocking position, as best shown in FIGS. 3 and 4, in which the plate 62 uncovers the through hole 614, and permits entry of air into the workpiece-supporting box 20 and through the outlet port 251 and the through hole 614.

The work table of the present invention can be converted into a cleaning mode so as to serve as a vacuum cleaner. In the cleaning mode, the plate 62 is moved to the blocking position, as shown in FIGS. 3 and 5, the cap 70 is removed from the free end 533E of the branch 533 and a suction pipe 80 (see FIG. 5) is attached to the free end 533E of the branch 533. Cleaning operation can be performed upon actuation of the blower 51.

With this invention thus explained, it is apparent that numerous modifications and variations can be made without departing from the scope and spirit of this invention. It is therefore intended that the invention be limited only as indicated in the appended claims.

I claim:

1. A work table comprising:

a stand;

a workpiece-supporting box including a bottom plate disposed on said stand and having a peripheral edge, and a peripheral wall extending upwardly from said peripheral edge of said bottom plate to define a receiving chamber, said bottom plate being formed with an outlet port;

a sawdust collecting mechanism including
opposing left and right guide plates extending inclinedly and downwardly from said peripheral wall toward said outlet port, said left and right guide plates having opposing end walls distal from said peripheral wall and cooperating with said bottom plate to define a groove that is in fluid communication with said outlet port,
a distributor member of an inverted U-shaped cross section, said distributor member being disposed in said groove, cooperating with said bottom plate to confine a lower chamber in fluid communication with said outlet port, and cooperating with said left and right guide plates and said peripheral wall to confine an upper chamber above said lower chamber, said distributor member being formed with a plurality of spaced apart entrance holes that fluidly communicate said upper and lower chambers, and
a working panel disposed on said peripheral wall, covering said upper chamber, and formed with a plurality of spaced apart apertures that are in fluid communication with said upper chamber;

a suctioning device including a blower with an inlet and an outlet, a sawdust collecting container connected to said outlet of said blower, and an air conduit having a first end connected to said outlet port in said bottom plate, a second end connected to said inlet of said blower, and a branch disposed between said first and second ends and having a free end; and a suction-switching unit including a cap detachably mounted on said free end of said branch for sealing said branch so as to prevent air from flowing therethrough upon actuation of said blower, and a blind mounted movably on said air conduit between said outlet port in said bottom plate and said branch, and movable between a blocking position, in which said blind extends into said air conduit to prevent air from being introduced into said workpiece-supporting box and through said outlet port upon actuation of said blower, and a non-blocking position, in which said blind retracts from said air conduit so as to permit entry of air into said workpiece-supporting box and through said outlet port upon actuation of said blower and so as to permit collection of sawdust resulting from an abrasive operation performed on said working panel in said sawdust collecting container via said apertures in said working panel, said upper and lower chamber, said outlet port in said bottom plate, and said air conduit.

* * * * *